(12) United States Patent
Dinkjian et al.

(10) Patent No.: US 7,996,614 B2
(45) Date of Patent: Aug. 9, 2011

(54) CACHE INTERVENTION ON A SEPARATE DATA BUS WHEN ON-CHIP BUS HAS SEPARATE READ AND WRITE DATA BUSSES

(75) Inventors: Robert Michael Dinkjian, Round Rock, TX (US); Bernard Charles Drerup, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 528 days.

(21) Appl. No.: 11/969,256

(22) Filed: Jan. 4, 2008

(65) Prior Publication Data

US 2009/0177821 A1    Jul. 9, 2009

(51) Int. Cl.
G06F 12/00 (2006.01)
G06F 13/00 (2006.01)
G06F 13/28 (2006.01)

(52) U.S. Cl. .......... 711/118; 711/124; 711/119; 710/27; 710/110

(58) Field of Classification Search .................... 711/118
See application file for complete search history.

(56) References Cited

U.S. PATENT DOCUMENTS

| | | | |
|---|---|---|---|
| 5,895,484 A | | 4/1999 | Arimilli et al. |
| 6,016,526 A | * | 1/2000 | Arimilli et al. ................ 710/105 |
| 6,055,608 A | | 4/2000 | Arimilli et al. |
| 6,112,016 A | | 8/2000 | MacWilliams et al. |
| 2002/0013886 A1 | * | 1/2002 | Higuchi et al. ................ 711/130 |
| 2002/0069333 A1 | | 6/2002 | Ghosh et al. |
| 2003/0005238 A1 | * | 1/2003 | Pawlowski .................... 711/146 |
| 2004/0024987 A1 | | 2/2004 | Lentz et al. |
| 2004/0059875 A1 | * | 3/2004 | Garg et al. ..................... 711/141 |
| 2004/0230751 A1 | | 11/2004 | Blake et al. |
| 2005/0262368 A1 | * | 11/2005 | Cherukuri et al. ............ 713/324 |
| 2006/0184743 A1 | | 8/2006 | Guthrie et al. |

* cited by examiner

*Primary Examiner* — Brian R Peugh
*Assistant Examiner* — Prasith Thammavong
(74) *Attorney, Agent, or Firm* — Yee & Associates, P.C.; Thomas E. Tyson

(57) ABSTRACT

Computer implemented method, system and computer usable program code for processing a data request in a data processing system. A read command requesting data is received from a requesting master device. It is determined whether a cache of a processor can provide the requested data. Responsive to a determination that a cache of a processor can provide the requested data, the requested data is routed to the requesting master device on an intervention data bus of the processor separate from a read data bus and a write data bus of the processor.

18 Claims, 4 Drawing Sheets

CACHE INTERVENTION ON A SEPARATE DATA BUS WHEN ON-CHIP BUS HAS SEPARATE READ AND WRITE DATA BUSSES

BACKGROUND OF THE INVENTION

1. Field of the Invention

The present invention relates generally to the data processing field and, more particularly, to a computer implemented method, system and computer usable program code for processing a data request in a data processing system that includes an on-chip bus system that interconnects one or more processors and has separate read and write data busses, and wherein the processors and the bus system have an intervention capability.

2. Description of the Related Art

Exemplary embodiments are directed to data processing systems that include on-chip bus systems that interconnect one or more hardware coherent processors. (The term "processor" as used herein generally refers to a processor and one or more caches that are associated with the processor). Exemplary embodiments are also directed to data processing systems that include on-chip bus systems that have separate read and write data busses, and to processors and busses that have an intervention capability. "Intervention", as used herein, relates to a mechanism by which a master device, for example, a processor or an input/output (I/O) master device, makes a read request to a slave device, for example, a memory such as a main memory, but the requested data is locally held by a cache (typically a cache associated with a processor); and the cache provides the data instead of the slave device. In such a situation, the cache provides "intervention data" when a snooping process, which occurs among all snoopers (processors) and a bus controller, determines that read data can and should be provided from the cache rather than from a slave device.

In a data processing system, a processor typically sends outgoing data, including castout data (cached data that has been written or modified by the processor and is subsequently being written to memory), to the processor's write data bus. For intervention, however, the outgoing data must eventually reach the read bus of the master requesting the data. In a known system, snoop-pushes (cache line pushes generated in response to snoops) were sent out a processor's write data bus, and a buffer in a bus controller was used to capture the data from the write data bus and send the data to the requesting master's read data bus. The buffer was needed, rather than just using routing logic (mux), because the read and write data busses operate independently. Using a buffer for such a purpose, however, is complex, adds area and power requirements, and increases latency.

There is, accordingly, a need for an improved mechanism for processing a data request in a data processing system that includes an on-chip bus system that interconnects one or more processors and has separate read and write data busses, and wherein the processors and the bus system have an intervention capability.

SUMMARY OF THE INVENTION

Exemplary embodiments provide a computer implemented method, system and computer usable program code for processing a data request in a data processing system. A read command requesting data is received from a requesting master device. It is determined whether a cache of a processor can provide the requested data. Responsive to a determination that a cache of a processor can provide the requested data, the requested data is routed to the requesting master device on an intervention data bus of the processor separate from a read data bus and a write data bus of the processor.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an exemplary embodiment when read in conjunction with the accompanying drawings, wherein:

DETAILED DESCRIPTION OF THE PREFERRED EMBODIMENT

Figure 1:
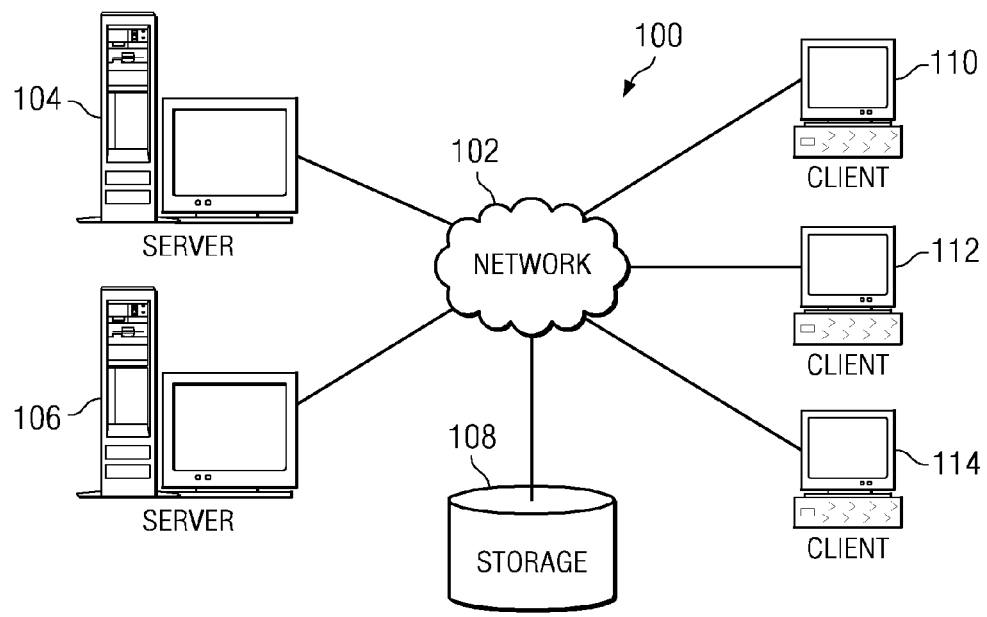
FIG. 1 depicts a pictorial representation of a network of data processing systems in which illustrative embodiments may be implemented.
Figure 2:
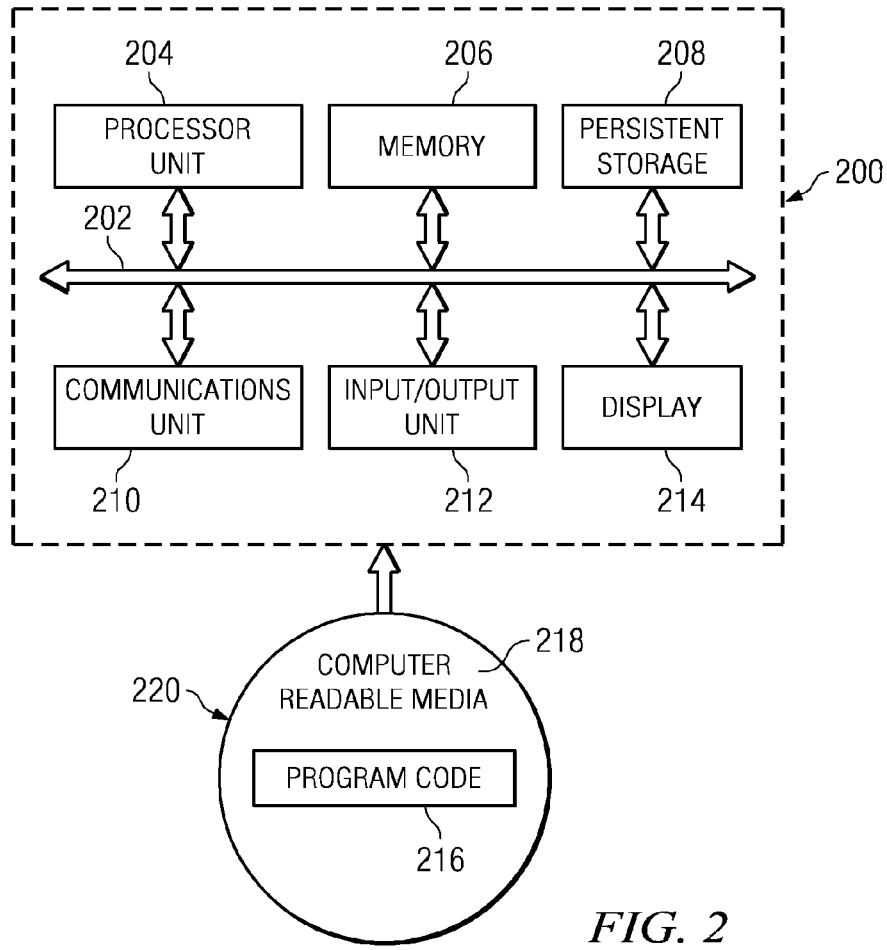
FIG. 2 illustrates a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214. Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different exemplary embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Exemplary embodiments provide a computer implemented method, system and computer usable program code for processing a data request in a data processing system that includes an on-chip bus system that interconnects one or more processors and has separate read and write data busses, and wherein the processors and the bus system have an intervention capability.

A computer implemented method, system and computer usable program code for processing a data request according to exemplary embodiments may be implemented in a data processing system such as data processing system 200 illustrated in FIG. 2.

A data processing system according to an exemplary embodiment has a bus system that includes a bus controller having a slave interface that supports multiple slave devices per slave interface and that supports read data tenures independent of (including without) a command tenure. A "tenure"

as used herein is a period of time devoted to transfer of a block of data. For example, if a bus width is 16 bits and a data block is 128 bits; eight periods are needed to transfer all the data, and the eight periods comprises a tenure. Thus, a read data tenure is the period of time devoted to reading a block of data and a command tenure is the period of time devoted to issuing command information.

A bus system according to an exemplary embodiment includes, in addition to a read data bus and a write data bus, a separate data bus, referred to herein as an "intervention data bus" for each processor in a data processing system. Whenever a processor provides intervention data, the data will go out on the processor's intervention data bus instead of on the processor's write bus. According to one exemplary embodiment, the processor determines whether it will send intervention data during a snooping process that occurs for each snoopable request. In particular, during a snooping process, the snoopable request is broadcast to all processors (or to directories that track the location of cached lines) in the data processing system. The processors check to see if they have a copy of the requested data in their respective caches. If a processor has the requested data, and the request is a read request, then the processor may directly determine to provide the intervention data. The determination may be made based on buffer and routing resource availability within the processor. Intervention is typically lower in priority than processor core requests, and, accordingly, may not occur if there are conflicts for those resources.

According to an alternative exemplary embodiment, the processors tell the bus controller whether they are able to provide intervention data. The bus controller then makes the decision of which, if any, processor shall provide the intervention data, and informs the processors of the decision.

Figure 3:
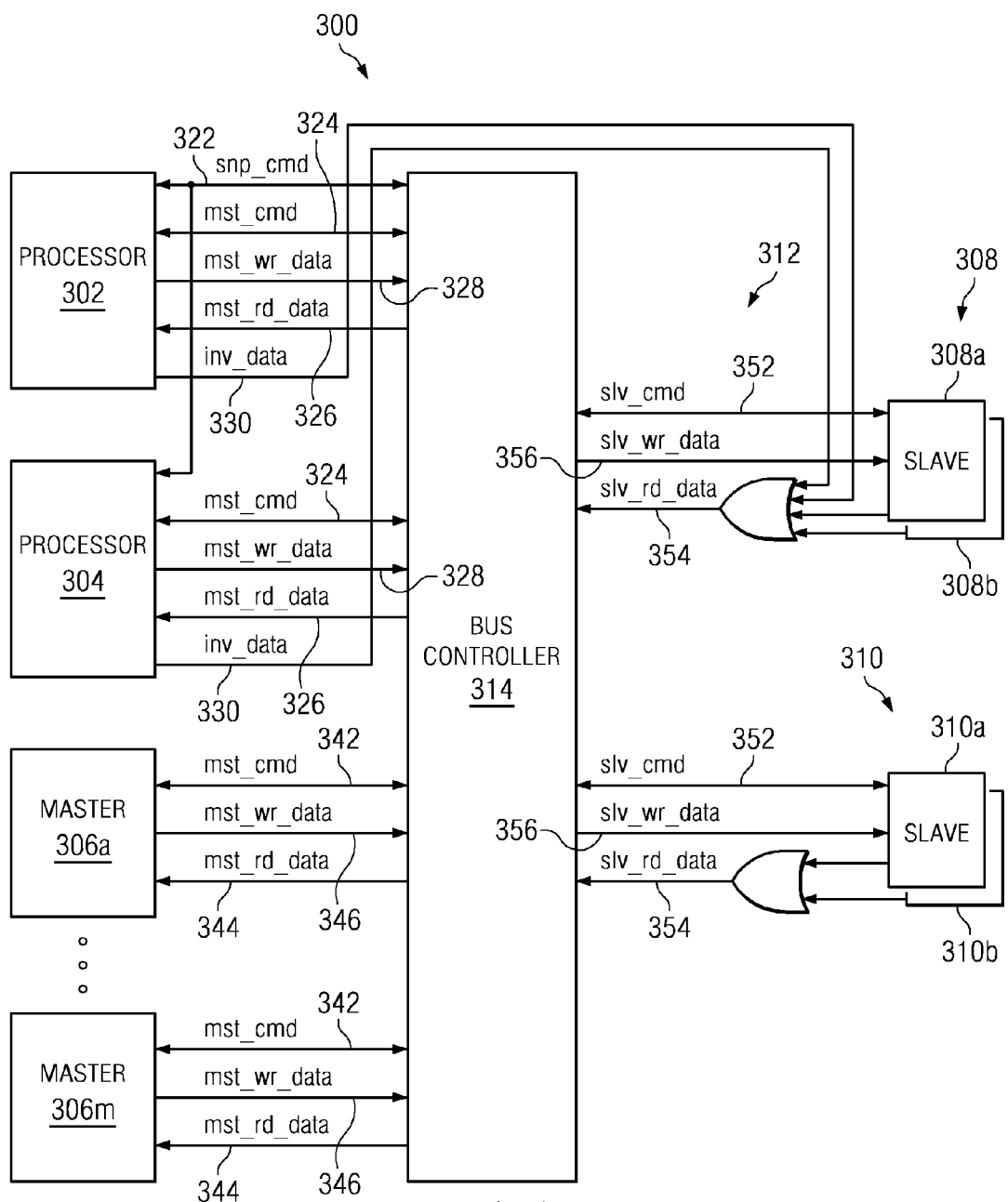
FIG. 3 is a block diagram that schematically illustrates a bus system for interconnecting processors, master devices and slave devices in a data processing system according to an exemplary embodiment.

FIG. 3 is a block diagram that schematically illustrates a bus system for interconnecting processors, master devices and slave devices in a data processing system according to an exemplary embodiment. The data processing system is generally designated by reference number 300, and in the exemplary embodiment illustrated in FIG. 3, includes two processors 302 and 304; a plurality of master devices 306a-306m, and two groups of slave devices 308 and 310. The processors, the master devices and the slave devices are all connected to one another via a bus system, generally designated by reference number 312, which includes bus controller 314.

In the exemplary embodiment illustrated in FIG. 3, processors 302 and 304 comprise hardware coherent processors that are interconnected to one another by on-chip busses. Although two processors are shown, it should be understood that this is intended to be exemplary only as data processing system 300 may include one or more processors.

Master devices 306a-306m comprise devices that request the transfer of data, for example, processors or input/output (I/O) master devices; and slave devices 308 and 310 comprise groups of slave devices that respond to requests for data transfer such as a main memory or a cache or a portion of a cache that functions as a slave memory. It should also be understood that data processing system 300 may also include any number of master and slave devices.

Bus system 312 includes bus controller 314, and a plurality of busses that connect the processors and the master and slave devices to bus controller 314. According to an exemplary embodiment, bus system 312 includes separate read and write data busses 326 and 328, respectively, connected to each processor 302 and 304. In addition, each processor includes a separate intervention data bus 330. As will be described more fully hereinafter, whenever a processor provides intervention data, the data will go out on the processor's intervention data bus 330 instead of on the processor's write data bus 328.

Processors 302 and 304 also each include a master command bus 324, and share a snoop command bus 322. These busses are used to transfer command information including, for example, address information and request length or whether a request is a read or a write request and the like, as opposed to transferring data.

As also shown in FIG. 3, each master device 306a-306m also includes a command bus 342 and separate read and write data busses 344 and 346 connected to bus controller 314. In addition, each group of slave devices 308 and 310 includes a command bus 352, a read data bus 354 and a write data bus 356 that connect the slave devices in the group, for example, slave devices 308a and 308b of group 308 and slave devices 310a and 310b of group 310, to bus controller 314. In this regard, the data busses to/from each master or slave device are separate, as shown in FIG. 3. Bus controller 314, however, has two separate fabrics—one that interconnects all the read data busses with signals propagating from slave devices to master devices, and one that interconnects all the write data busses with signals propagating from master devices to slave devices.

In the exemplary embodiment illustrated in FIG. 3, each group of slave devices 308 and 310 includes two separate slave devices 308a, 308b and 310a, 310b (i.e., different memory areas that respond to non-overlapping address ranges). This is intended to be exemplary only as slave device groups 308 and 310 may each comprise one or more separate slave devices.

As also shown in FIG. 3, the slv_rd_data signals carried on read data bus 354 of each group of slave devices 308 and 310 is actually the OR of data signals from each separate slave device in the group. Furthermore, the intervention data bus 330 of each processor 302 and 304 has the same interface as a slave read data bus (slave read data bus 354 of slave device group 308 in the exemplary embodiment illustrated in FIG. 3), and, is attached to bus controller 314 as if it were just another slave device.

Figure 4:
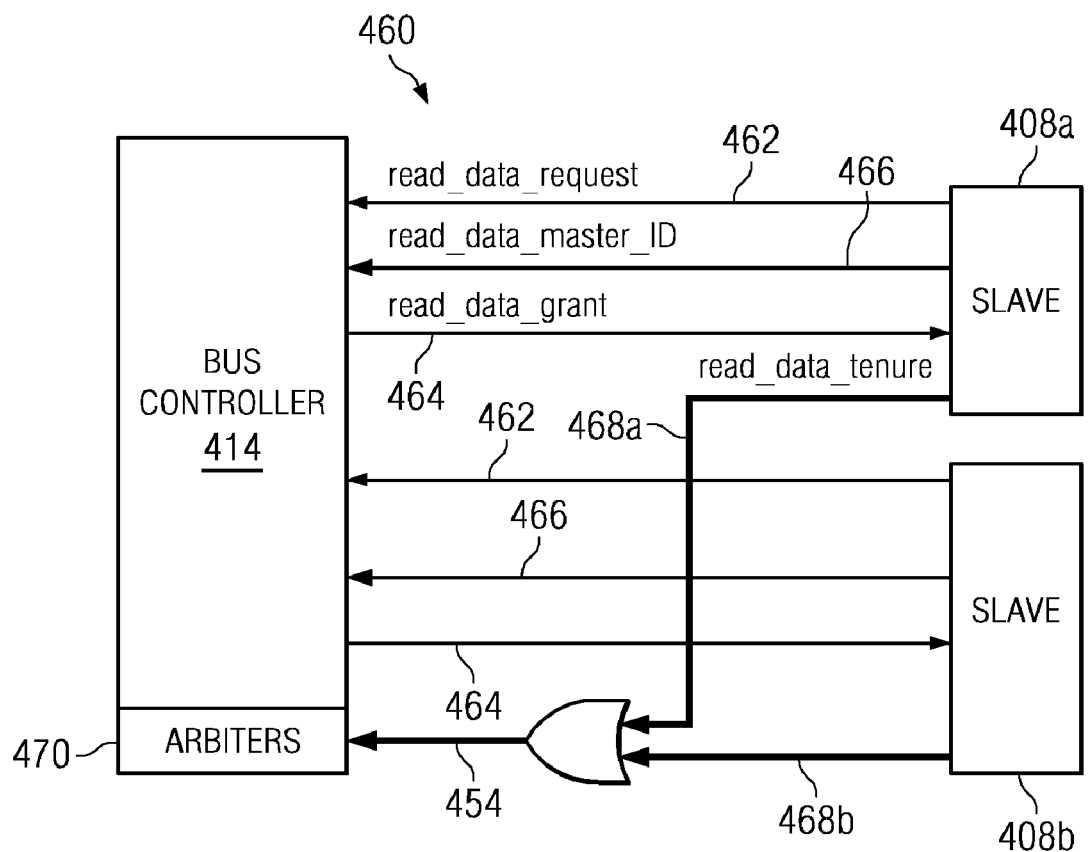
FIG. 4 is a block diagram that schematically illustrates details of the bus system of FIG. 3 according to an exemplary embodiment.

The slave read data interface also includes a small number of signals that are not ORed, but that are unique between the bus controller and each separate slave device 308a, 308b or 310a, 310b. These signals are not illustrated in FIG. 3; however, they are illustrated in FIG. 4 which is a block diagram that schematically illustrates details of the bus system of FIG. 3 according to an exemplary embodiment. More particularly, FIG. 4 illustrates two individual slave devices 408a and 408b attached to one read data interface of bus controller 414 via read data bus 454 according to an exemplary embodiment. Slave devices 408a and 408b may be implemented, for example, as separate slave devices 308a and 308b in FIG. 3, and bus controller 414 may be implemented as bus controller 314 in FIG. 3.

The bus protocol, and thus, the bus controller and slave devices illustrated in FIGS. 3 and 4, is designed such that a read data bus can send data to any master device following a request-grant type handshake. This is done via a read data bus interface, generally designated by reference number 460, that includes read_data_request signal 462 and read_data_grant signal 464, as well as a read_data_master_ID signal 466 that indicates the particular destination master of the read data. The value driven on read_data_master_ID is acquired by the slave devices and processors during the command or snoop phase of a transaction. This also requires tagged, out-of-order read data support (if a master can have more than one read request pending) since the intervention read data may arrive at a master in any order relative to other read data packets.

The read data bus protocol is defined to allow multiple slave devices to provide read data to the bus controller. This can be done without any corresponding command tenure by having a set of arbiters, generally designated by reference number 470, within the bus controller, one arbiter for each master device (read data destination), which selects among all possible read sources. The arbiter selects (grants) the read data bus to a device for a single data tenure, which may be one or more data beats (periods). To do this, the bus controller has unique read_data_request 462, read_data_grant 466 and read_data_master_ID 464 signals per separate slave device 408a and 408b, but combined (ORed) read_data_tenure signals 454 from all of the separate slave devices. There may be more than one set of combined signals if the bus has multiple crossbar ways such as the two shown in FIG. 3.

The read_data_tenure signals 468a, 468b from each slave device 408a, 408b are each actually a collection of many signals including the read_data_bus signals (which may be 128-byte wide), read_data_ack signals, read_data_parity signals and more. These combined signals are ORed together, to provide combined read_data_tenure signal 454. The slave devices drive zeroes on the combined signal bus when the bus is not granted to them.

As indicated above, intervention data busses 330 of processors 302 and 304 illustrated in FIG. 3, attach into the bus controller as if they were from slave devices. However, the intervention data busses only attach to the read data bus interface, not to the command or write data bus interfaces.

Intervention data busses 330 can be tied into any slave read data bus when the bus controller supports multiple slave interfaces as crossbar "ways", not just to slave group 308 as shown in FIG. 3. Selection of the slave data read bus to tie into may be based on the bandwidth needs of the various slaves and intervenors.

Intervention data bus 330 can also be used as a slave-read data bus when the processor's cache, typically the processor's L2 cache, is capable of being used as a slave memory. For example, when a slave memory is using a portion of L2 RAM as a separate memory space, rather than as a cache of main memory, and this separate memory space can be read and written by the processor and by bus masters. Support for a slave memory will also require the addition of an address/command bus and a slave-write data bus from the bus controller to the cache.

Figure 5:
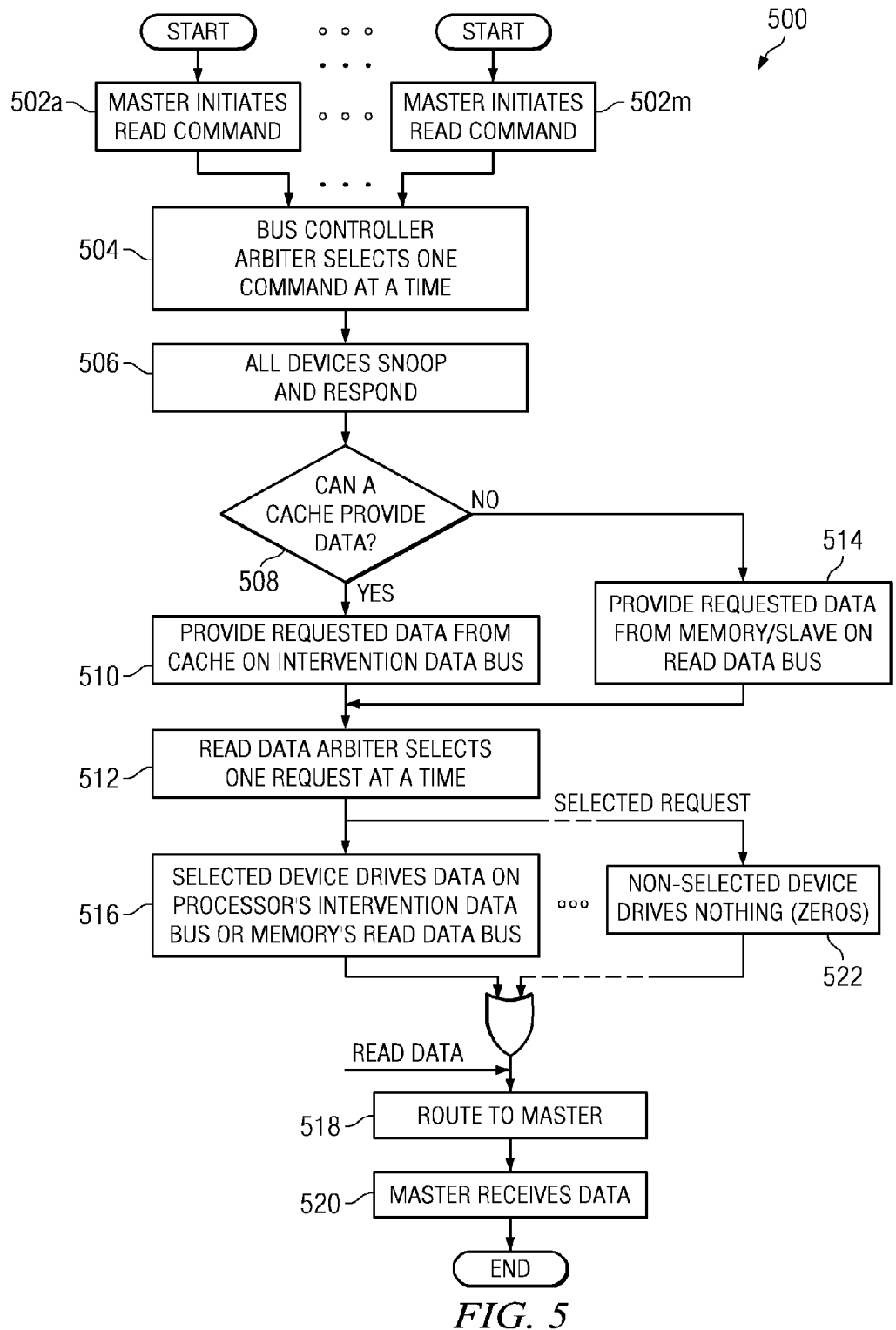
FIG. 5 is a flowchart that illustrates a method for processing a data request in a data processing system according to an exemplary embodiment.

FIG. 5 is a flowchart that illustrates a method for processing a data request in a data processing system according to an exemplary embodiment. The method is generally designated by reference number 500, and begins by one or more master devices initiating a read command requesting data. In FIG. 5, a plurality of master devices have initiated read commands (Steps 502a . . . 502m). A bus controller command arbiter selects one read command at a time and broadcasts the request (Step 504). All slave devices in the data processing system snoop and respond, indicating whether they can provide the data requested in each selected read command (Step 506).

A determination is also made whether a cache associated with a processor can provide the data requested in each read command (Step 508). Responsive to a determination that a cache associated with a processor can provide the data requested in a read command (Yes output of Step 508), the requested data is provided from a cache on an intervention data bus of the processor (Step 510), and a read data arbiter selects one request to be read at a time (Step 512).

Returning to Step 508, responsive to a determination that a cache cannot provide the data requested in a read command (No output of Step 508), the requested data is provided from memory (a slave device) on the read data bus of the processor (Step 514), and the read data arbiter selects one request to be read at a time (Step 512).

For data to be furnished from a cache (intervention data), the processor drives the data on an intervention data bus (Step 516), the data is routed to the requesting master (Step 518), the requesting master receives the data (Step 520), and the method ends. When intervention data is furnished, slave devices that are not selected to furnish the data drive nothing, i.e., zeroes (Step 520) which are also routed to and received by the master as shown in FIG. 5. For data to be furnished from memory (a slave device), the selected device drives the data on the device's read data bus (Step 516), the data is routed to the requesting master (Step 518), and the requesting master receives the data (Step 520)

Exemplary embodiments thus provide a computer implemented method, system and computer usable program code for processing a data request in a data processing system. A read command requesting data is received from a requesting master device. It is determined whether a cache of a processor can provide the requested data. Responsive to a determination that a cache of a processor can provide the requested data, the requested data is routed to the requesting master device on an intervention data bus of the processor separate from a read data bus and a write data bus of the processor.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The computer readable storage medium can be an electronic, magnetic, optical, electromagnetic, infrared, or semiconductor system, apparatus, or device. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for processing a data request in a data processing system, comprising:
   receiving a read command from a requesting master device requesting data;
   determining whether a cache of a processor can provide the requested data;
   responsive to a determination that the cache of the processor can provide the requested data, routing the requested data to the requesting master device on an intervention data bus of the processor separate from a read data bus and a write data bus of the processor, wherein the processor and the requesting master device are separate devices; and
   responsive to a determination that the cache of the processor cannot provide the requested data, routing the requested data to the requesting master device from a slave device on a read data bus of the slave device, wherein the intervention data bus of the processor and the read data bus of the slave device have a same interface to a bus controller that routes the requested data to the requesting master device and wherein a read data signal on the read data bus of the slave device comprises an output from an OR gate having inputs of a read data signal from the slave device and a data signal from the intervention bus.

2. The computer implemented method of claim 1, and further comprising:
   responsive to a determination that a cache of a processor can provide the requested data, routing the read command to the processor on the intervention data bus.

3. The computer implemented method of claim 1, wherein a plurality of read commands requesting data are received from a plurality of master devices, and further comprising:
   broadcasting one read command of the plurality of read commands at a time.

4. The computer implemented method of claim 3 and further comprising:
   reading one broadcast read command of the plurality of read commands at a time.

5. The computer implemented method of claim 1, and further comprising:
   selecting the cache of the processor that can provide the requested data from a plurality of caches that can provide the requested data.

6. The computer implemented method of claim 1, wherein the slave device comprises one slave device in a group of a plurality of slave devices, and wherein the read data signal on the read data bus of the slave device comprises an output from an OR gate having inputs of read data signals from each slave device in the group of slave devices and the data signal from the intervention bus.

7. A computer program product comprising:
   a computer readable storage medium having computer usable program code for processing a data request in a data processing system, the computer program product comprising:
   computer usable program code configured for receiving a read command from a requesting master device requesting data;
   computer usable program code configured for determining whether a cache of a processor can provide the requested data;
   computer usable program code, responsive to a determination that a cache of a processor can provide the requested data, configured for routing the requested data to the requesting master device on an intervention data bus of the processor separate from a read data bus and a write data bus of the processor, wherein the processor and the requesting master device are separate devices; and
   computer usable program code, responsive to a determination that the cache of the processor cannot provide the requested data, configured for routing the requested data to the requesting master device from a slave device on a read data bus of the slave device, wherein the intervention data bus of the processor and the read data bus of the slave device have a same interface to a bus controller that routes the requested data to the requesting master device and wherein a read data signal on the read data bus of the slave device comprises an output from an OR gate having inputs of a read data signal from the slave device and a data signal from the intervention bus.

8. The computer program product of claim 7, and further comprising:
   computer usable program code, responsive to a determination that a cache of a processor can provide the requested data, configured for routing the read command to the processor on the intervention data bus.

9. The computer program product of claim 7 further comprising:
   computer usable program code, responsive to a determination that a cache of a processor can provide the requested data, configured for routing the read command to the processor on the intervention data bus.

10. The computer program product of claim 7, wherein a plurality of read commands requesting data are received from a plurality of master devices, and further comprising:
    computer usable program code configured for broadcasting one read command of the plurality of read commands at a time.

11. The computer program product of claim 10 further comprising:
    computer usable program code configured for reading one broadcast read command of the plurality of read commands at a time.

12. The computer program product of claim 7 further comprising:
    computer usable program code configured for selecting the cache of the processor that can provide the requested data from a plurality of caches that can provide the requested data.

13. The computer program product of claim 7, wherein the slave device comprises one slave device in a group of a plurality of slave devices, and wherein the read data signal on the read data bus of the slave device comprises an output from an OR gate having inputs of read data signals from each slave device in the group of slave devices and the data signal from the intervention bus.

14. A system for processing a data request in a data processing system, the system comprising:
- a bus controller operably connected to a requesting master device, the bus controller configured to receive a read command from the requesting master device requesting data;
- a processor configured to determine whether a cache of the processor can provide the requested data;
- an intervention data bus of the processor that is separate from a read data bus and a write data bus of the processor, the intervention data bus configured to route the requested data to the requested master device in response to a determination that the cache of the processor can provide the requested data, wherein the processor and the requesting master device are separate devices; and
- a slave device having a read data bus, the slave device configured to route the requested data to the requesting master device the read data bus, in response to a determination that the cache of the processor cannot provide the requested data, wherein the intervention data bus of the processor and the read data bus of the slave device have a same interface to a bus controller that routes the requested data to the requesting master device and wherein a read data signal on the read data bus of the slave device comprises an output from an OR gate having inputs of a read data signal from the slave device and a data signal from the intervention bus.

15. The system of claim 14 wherein the intervention data bus is configured to route the read command to the processor in response to a determination that the cache of the processor can provide the requested data.

16. The system of claim 14 further comprising:
- a selector configured to select the cache of the processor that can provide the requested data from a plurality of caches that can provide the requested data.

17. The system of claim 14, wherein the slave device comprises one slave device in a group of a plurality of slave devices, and wherein the read data signal on the read data bus of the slave device comprises an output from an OR gate having inputs of read data signals from each slave device in the group of slave devices and the data signal from the intervention bus.

18. The computer implemented method of claim 1, wherein routing the requested data to the requesting master device on the intervention data bus of the processor further comprises:
- routing the requested data to bus controller that routes the requested data to the requesting master device.

* * * * *